United States Patent [19]

Furuta et al.

[11] Patent Number: 4,466,246
[45] Date of Patent: Aug. 21, 1984

[54] BRAKE BOOSTER AND MASTER CYLINDER WITH MOUNTING

[75] Inventors: Youichi Furuta, Chiryu; Kaoru Tsubouchi, Toyota; Michiharu Nishii, Chiryu; Yuzuru Sugiura, Anjyo; Shozaburo Tsuchida, Susono, all of Japan

[73] Assignees: Aisin Seiki Kabushiki Kaisha, Kariya; Toyota Jidosha Kabushiki Kaisha, Toyota, both of Japan

[21] Appl. No.: 450,048

[22] Filed: Dec. 15, 1982

[30] Foreign Application Priority Data

Dec. 16, 1981 [JP] Japan .......................... 56-187724[U]

[51] Int. Cl.$^3$ ............................................. B60T 13/46
[52] U.S. Cl. ................................. 60/547.1; 92/98 D; 92/99; 92/169; 91/369 A
[58] Field of Search ............. 91/369 A; 92/99, 98 D, 92/128; 60/547.1

[56] References Cited

U.S. PATENT DOCUMENTS

| 3,614,911 | 10/1971 | Belart . |
| 4,072,085 | 2/1978 | Soupal . |
| 4,208,872 | 6/1980 | Shimizu et al. ................ 60/547.1 |
| 4,330,996 | 5/1982 | Becht et al. .................... 92/48 |

Primary Examiner—Robert E. Garrett
Assistant Examiner—Scott L. Moritz
Attorney, Agent, or Firm—Finnegan, Henderson, Farabow, Garrett & Dunner

[57] ABSTRACT

A brake booster includes a body having a central wall portion on which a, doughnut-shaped reinforcement plate is securely mounted, and bolts mounted on the reinforcement plate for fastening a master cylinder to the central wall portion. The reinforcement plate has an annular ridge extending along an inner peripheral edge thereof and projecting against the reinforcement plate. The master cylinder includes a flange mounted on the body and having an inner peripheral portion held against the central wall portion of the body in axial alignment with the annular ridge, and an outer peripheral portion spaced from the central wall portion by a distance such that the outer peripheral portion of the flange will not be forced into contact with the central wall portion when the master cylinder is actuated for braking action. Therefore, no localized forces are applied by the outer peripheral portion of the flange to the central wall portion of the body. The reinforcement plate held in intimate contact with the central wall portion serves to distribute forces fully over the central wall portion, which is less subjected to concentrated stresses and hence can be of a reduced thickness.

4 Claims, 9 Drawing Figures

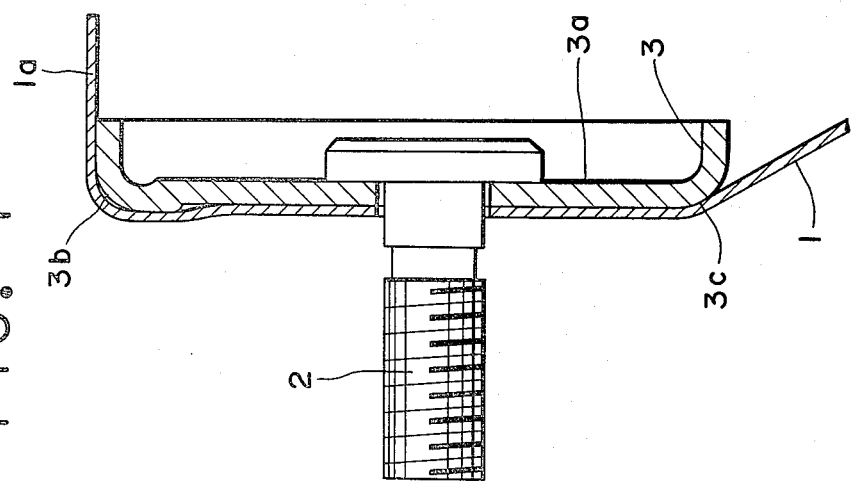
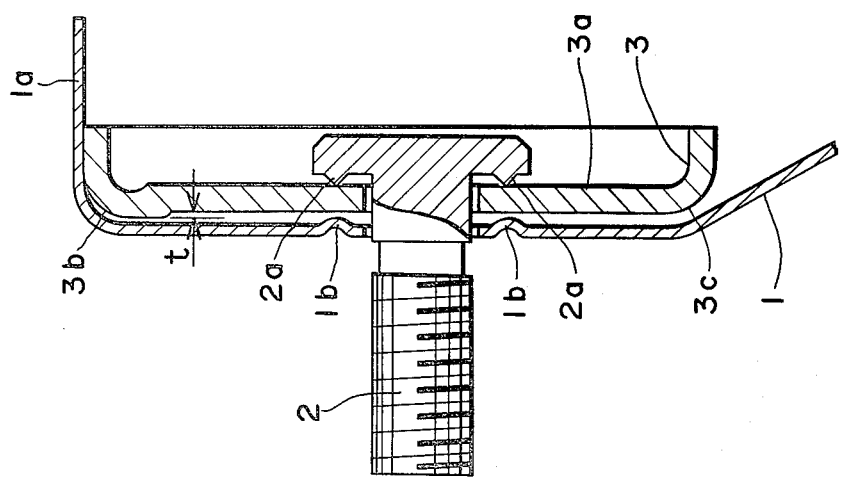

BRAKE BOOSTER AND MASTER CYLINDER WITH MOUNTING

BACKGROUND OF THE INVENTION

The present invention relates to a brake booster, and more particularly to a brake booster having an improved reinforcement plate mounted on a brake booster body by which the brake booster and a master cylinder are interconnected.

Brake boosters comprise a body and a casing connected to each other and jointly defining a space which is divided by a diaphragm into a vacuum chamber that is kept under vacuum at all times and an operating-pressure chamber in which atmospheric pressure or vacuum is introduced. The diaphragm is coupled to a power piston connected to a push rod coupled to a brake pedal. When the brake pedal is pushed down, atmospheric pressure is introduced into the operating-pressure chamber to power-assist the movement of the push rod. The motion of the push rod thus assisted under atmospheric pressure is then transmitted to the master cylinder mounted on the body of the brake booster.

The master cylinder is affixed to the brake booster body by bolts fastening an end of the master cylinder to the brake booster body. Direct attachment of the master cylinder to the brake booster body would require the body to be of an increased thickness for sufficient rigidity to support the master cylinder, thus increasing the weight of the brake booster. It has been customary to employ a brake booster body having a reduced thickness and a reinforcement plate for attaching the brake booster body to the master cylinder. More specifically, the reinforcement plate has a doughenut-shaped configuration and is made from a sheet of pressed metal which is attached in intimate contact to the entire inner surface of a central wall portion of the body for distributing stresses over the central inner wall of the body. The master cylinder is mounted on the central outer wall of the brake booster body which is reinforced by the reinforcement plate. When the braking action is applied to the master cylinder, however, high stresses tend to act on an outer peripheral portion of the reinforcement plate, resulting in a greater likelihood for the thin brake booster body to be damaged.

SUMMARY OF THE INVENTION

It is an object of the present invention to provide a brake booster which will eliminate the foregoing problem.

Another object of the present invention is to provide a brake booster having a body supporting on its central inner wall surface a doughnut-shaped reinforcement plate having at least one annular ridge extending along an inner peripheral edge of a bottom wall of the reinforcement plate, for preventing localized stresses from acting on the brake booster body.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

According to the present invention, a brake booster in combination with a brake master cylinder, comprises a brake-booster body having a central wall portion, a doughnut-shaped reinforcement plate held in intimate contact with the inner surface of the central wall portion and having an annular ridge extending along an inner peripheral edge of the reinforcement plate and projecting against the inner central portion, and bolts mounted on the reinforcement plate and the central wall portion for fastening the brake master cylinder to the body, a master cylinder flange including an inner peripheral portion held against said central wall portion in engagement with said annular ridge and an outer peripheral portion positioned radially inwardly of an outer peripheral edge of said reinforcement plate and spaced from said central wall portion by a distance such that no external forces will be imposed from said outer peripheral portion on said central wall portion when said master cylinder is actuated.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a fragmentary cross-sectional view of a reinforcement plate according to an embodiment of the present invention positioned before attachment bolts are welded to a brake booster, the view being illustrative at an enlarged scale of an encircled portion A of FIG. 1 with certain parts being omitted from illustration;

FIG. 4 is a fragmentary cross-sectional view of the reinforcement plate of FIG. 2 showing the position of the parts after they have been welded;

DETAILED DESCRIPTION

Figure 1:
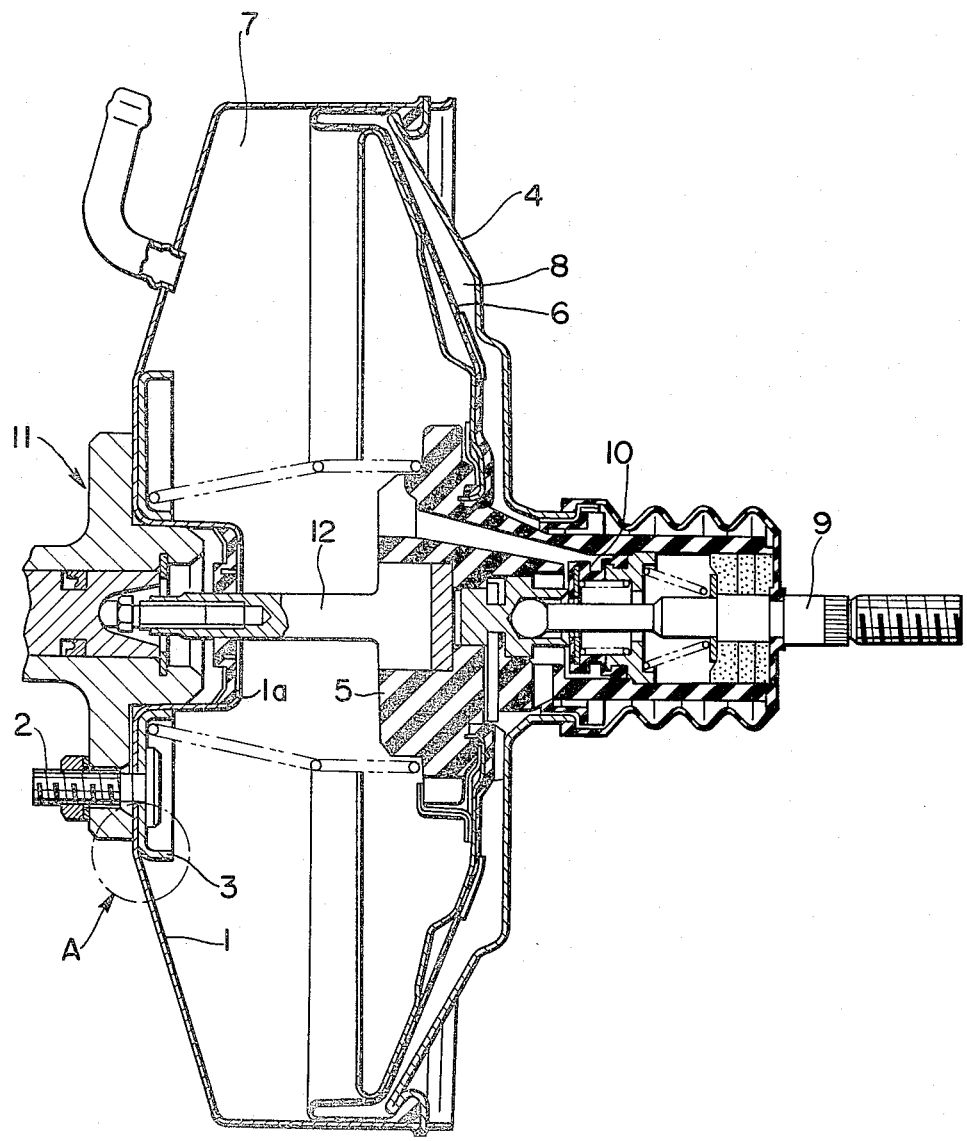
FIG. 1 is a cross-sectional view of a brake booster according to the present invention.

As shown in FIG. 1, a brake booster according to the present invention comprises a body 1 having a central wall portion to which a reinforcement plate 3 and attachment bolts 2 extending therethrough are fixed by projection welding. The brake booster also includes a casing 4 fixed to the body 1 and a diaphragm 6 having an outer peripheral edge supported by the portions of the body 1 and the casing 4 which are fastened together. The diaphragm 6 defines within the brake booster a vacuum chamber 7 which is kept under vacuum at all times and an operating-pressure chamber 8 in which is introduced atmospheric pressure or vacuum under the control of a control valve 10 which is opened and closed by a push rod 9 coupled to a power piston 5.

A master cylinder 11 is affixed by the bolts 2 to a central wall portion of the body 1 of the brake booster. The master cylinder 11 has an actuator piston actuatable by a push rod 12 attached to the power piston 5.

In FIG. 2, the reinforcement plate 3 is of a doughnut-shaped configuration and fitted over a projection 1a of the body 1 which supports the push rod 12. The reinforcement plate 3 has a bottom wall 3a with an annular ridge 3b projecting toward the body 1 and extending along the inner peripheral edge of the bottom wall 3a. The bottom wall 3a has a surface facing the body 1 and recessed a distance t from the surface of the annular ridge 3b.

Figure 3:
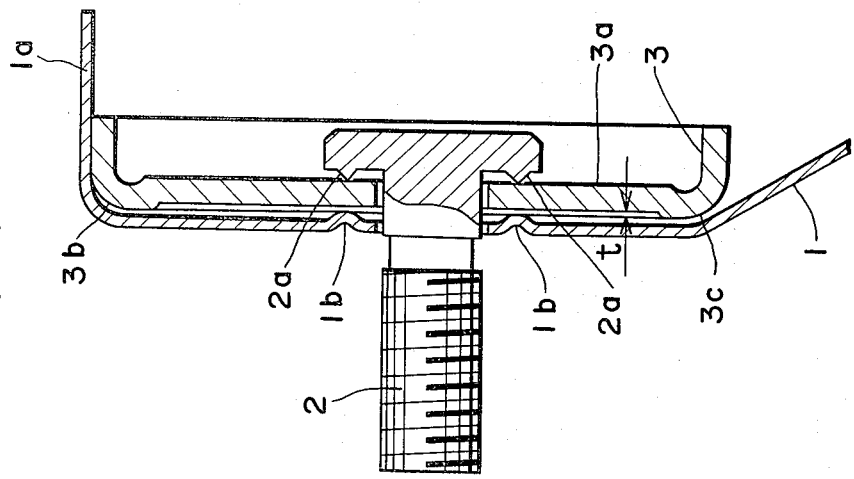
FIG. 3 is a view similar to FIG. 2, showing a reinforcement plate of another embodiment positioned prior to welding of attachment bolts to a brake booster.

According to another embodiment shown in FIG. 3, a bottom wall 3a of a reinforcement plate 3 has, in addition to an inner peripheral annular ridge 3b, an annular ridge 3c extending along the outer peripheral edge of the bottom wall 3a. The inner peripheral ridge 3b is wider than the outer peripheral ridge 3c. Preferably, the width of the inner peripheral ridge 3b is in the range of from 3 to 6 mm, and the width of the outer peripheral ridge 3c ranges from 1 to 2 mm.

The master cylinder 11 has a flange by which the master cylinder 11 is attached to the body 1, the flange being spaced at its outer peripheral edge from the outer peripheral ridge 3c by a distance that is preferably 3 mm or more.

The attachment bolts 2 include a head having a circular ridge 2a projecting leftwardly (as depicted in FIGS. 2 and 3) against the bottom wall 3a of the reinforcement plate 3. The body 1 has a projecting ring 1b protruding toward and in alignment with the circular ridge 2a with the bottom wall 3a interposed therebetween. For jointing the body 1, the reinforcement plate 3 and the attachment bolts 2 together, an electric current is passed through these members as they are pressed together for partially melting the ridge 2a and the ring 1b to thereby fasten the attachment bolts 2, the reinforcement plate 3 and the body 1 by way of projection welding.

Figure 5:
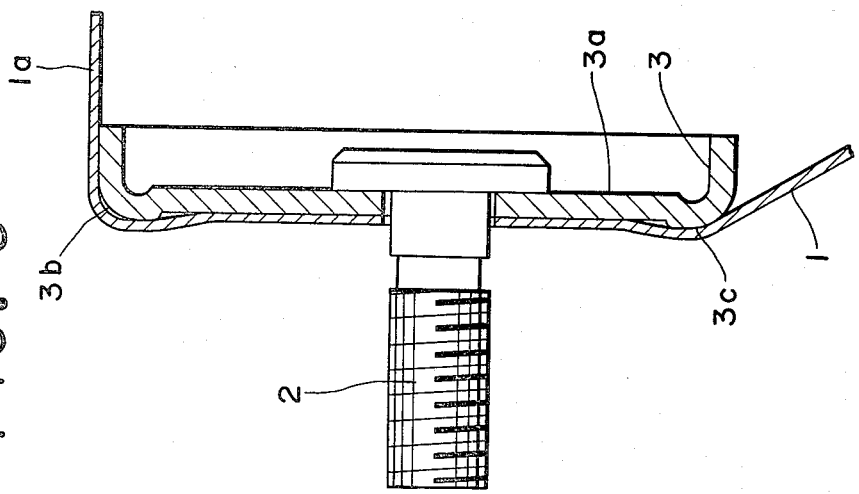
FIG. 5 is a fragmentary cross-sectional view of the reinforcement plate of FIG. 3 showing the position of the parts after they have been welded.

The assemblies of FIGS. 2 and 3 as they are thus welded together are illustrated in FIGS. 4 and 5, respectively. In FIG. 4, the central wall portion of the body 1 is held in intimate contact with the bottom wall 3a of the reinforcement plate 3 with the inner peripheral ridge 3b on the body 1 projecting against the central portion of the body 1. In FIG. 5, the central portion of the body 1 is held in intimate contact with the bottom wall 3a of the reinforcement plate 3 with the inner and outer peripheral ridges 3b, 3c on the body 1 projecting against the central portion of the body 1.

Figure 6:
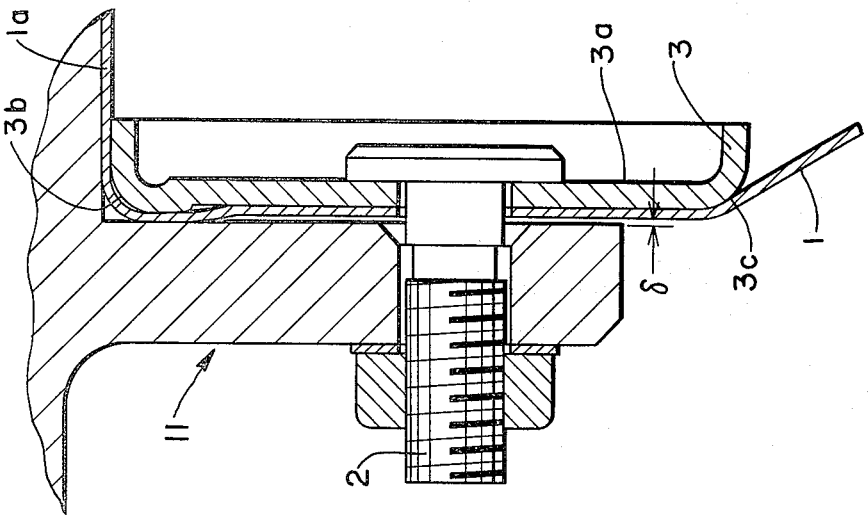
FIG. 6 is a fragmentary cross-sectional view of the brake booster of FIG. 4 on which a master cylinder is mounted.
Figure 7:
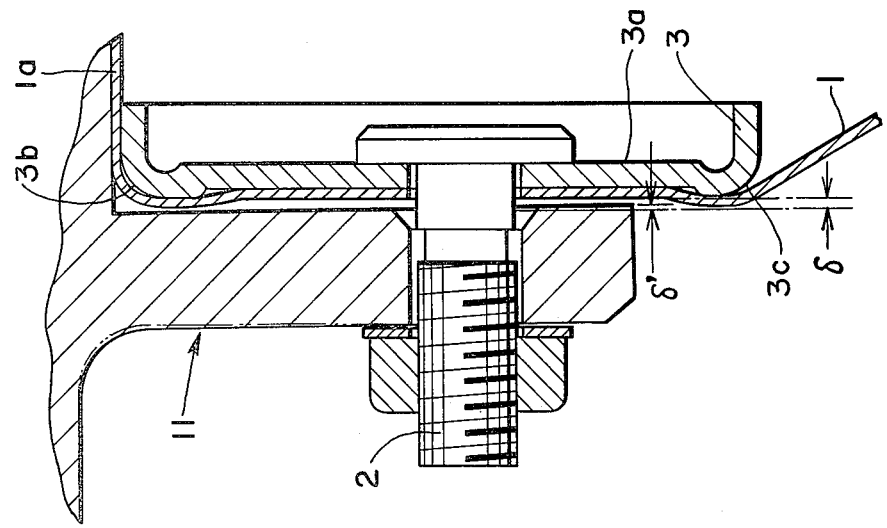
FIG. 7 is a fragmentary cross-sectional view of the brake booster of FIG. 5 on which a master cylinder is mounted.

FIGS. 6 and 7 illustrate the brake boosters, thus assembled as shown in FIGS. 4 and 5, respectively, after they are mounted on the master cylinder 11. In each arrangement, the flange of the master cylinder 11 has a surface spaced by a small distance δ from the outer surface of the central wall portion of the body 1 to which the reinforcement plate 3 is welded. The flange of the master cylinder 11 has an inner peripheral edge held against the central wall portion of the body 1 in axial alignment and engagement with the annular ridge 3b, and an outer peripheral edge spaced from the central wall portion of the body 1. The annular ridge 3c shown in FIG. 7 is positioned radially outwardly of the outer peripheral portion of the flange of the master cylinder 11.

Figure 8:
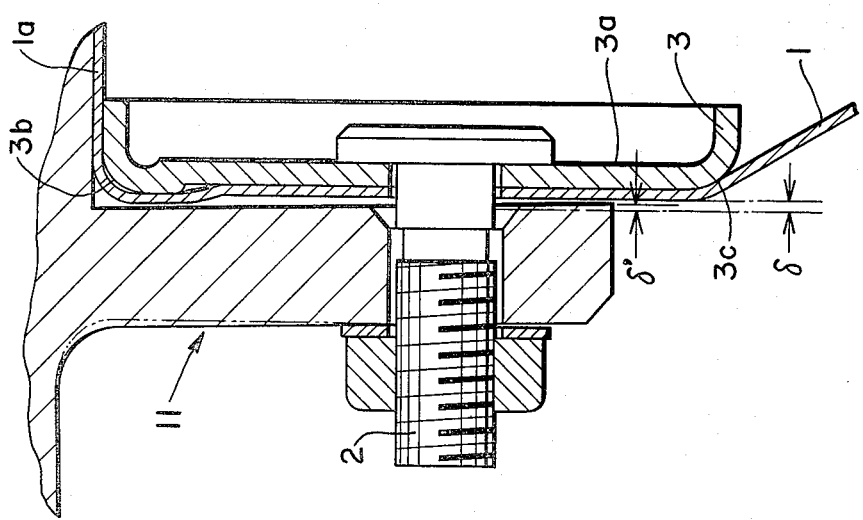
FIG. 8 is a fragmentary cross-sectional view of the assembly shown in FIG. 6, illustrative of the positional relationship between a flange of a master cylinder and a body of the brake booster when the master cylinder is actuated for braking action.
Figure 9:
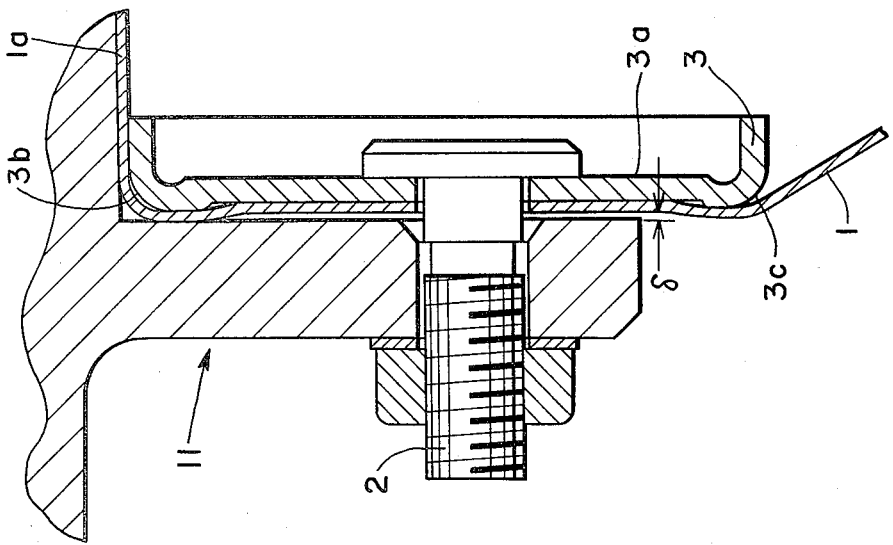
FIG. 9 is a view similar to FIG. 8, showing the assembly of FIG. 7.

When the master cylinder 11 is actuated to brake the car on which the brake booster is installed, the central axis portion of the master cylinder 11 tends to be displaced off the body 1 of the brake booster. With the flange of the master cylinder 11 fastened to the body 1 by the bolt 2, the flange of the master cylinder 11 is elastically deformed in such a way that the outer peripheral portion thereof is displaced toward the body 1, as shown in FIGS. 8 and 9, when the brake is applied. As a consequence, the distance δ between the master cylinder flange and the body 1 is reduced to a smaller extent δ', and the outer peripheral portion of the master cylinder flange may be positioned in slight or out of direct contact with the body 1. Accordingly, no localized stresses are transmitted from the master cylinder flange to the body 1, which is prevented from being damaged. The reinforcement plate 3 joined intimately to the body 1 serves to distribute the forces applied from the head of the bolt 2 widely over the body 1 during braking action. This prevents the body 1 from undergoing concentrated forces which would otherwise come from the bolt head, and consequently allows the body 1 to have a thin wall construction.

Although certain preferred embodiments have been shown and described in detail, it should be understood that many changes and modifications may be made therein without departing from the scope of the appended claims and equivalents.

What is claimed is:

1. A brake booster in combination with a brake master cylinder, comprising a brake-booster body having a central wall portion, a doughnut-shaped reinforcement plate held in intimate contact with the inner surface of said central wall portion and having an annular ridge extending along an inner peripheral edge of said reinforcement plate and projecting against said central wall portion of said body, and bolts mounted on said reinforcement plate and said central wall portion for fastening the brake master cylinder to said body, a master cylinder flange including an inner peripheral portion held against said central wall portion in engagement with said annular ridge and an outer peripheral portion positioned radially inwardly of an outer peripheral edge of said reinforcement plate and spaced from said central wall portion by a distance such that essentially no external stresses will be imposed by said outer peripheral portion on said central wall portion when said master cylinder is actuated.

2. A combination according to claim 1, wherein said reinforcement plate has an annular ridge extending along said outer peripheral edge and projecting against said central wall portion.

3. A combination according to claim 2, wherein, said annular ridge which extends along said outer peripheral edge is positioned radially outwardly of said outer peripheral portion of said flange.

4. A combination according to claim 3, wherein said outer peripheral portion of said flange is in slight contact with said central wall portion when said master cylinder is actuated and said flange is elastically deformed toward said central wall portion of said body.

* * * * *

UNITED STATES PATENT AND TRADEMARK OFFICE
CERTIFICATE OF CORRECTION

PATENT NO. : 4,466,246

DATED : August 21, 1984

INVENTOR(S) : FURUTA ET AL.

It is certified that error appears in the above-identified patent and that said Letters Patent is hereby corrected as shown below:

On the title page:

IN THE TITLE:

after "WITH" insert --IMPROVED--.

Signed and Sealed this

Twenty-first Day of May 1985

[SEAL]

Attest:

DONALD J. QUIGG

Attesting Officer     Acting Commissioner of Patents and Trademarks